Figure 1:
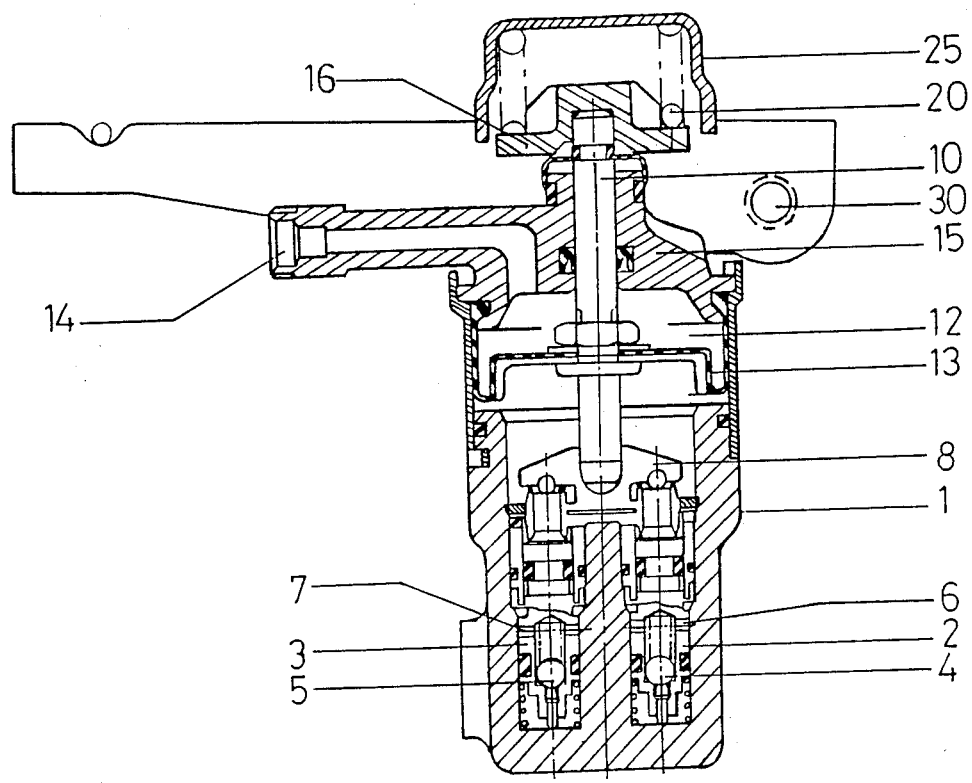

United States Patent [19]

Picot et al.

[11] Patent Number: 4,925,251
[45] Date of Patent: May 15, 1990

[54] BRAKE CORRECTOR SUBJECT TO THE LOAD OF A VEHICLE AS A FUNCTION OF THE SEATING OF THE LATTER

[75] Inventors: Pascal Picot, Bonneuil Sur Marne; Jean-Jacques Carré, Le Raincy, both of France

[73] Assignee: Bendix France, Drancy, France

[21] Appl. No.: 329,180

[22] Filed: Mar. 27, 1989

[30] Foreign Application Priority Data

Mar. 30, 1988 [FR] France ................. 88 04164

[51] Int. Cl.$^5$ ............................................. B60T 8/18
[52] U.S. Cl. ........................... 303/22.1; 303/9.69; 303/22.5; 280/6.12; 280/DIG. 1
[58] Field of Search .............. 303/9.69, 22.1, 22.3, 303/22.5, 22.8; 188/195; 280/6.12, 840, DIG. 1; 180/41

[56] References Cited

U.S. PATENT DOCUMENTS

| | | | |
|---|---|---|---|
| 3,107,127 | 10/1963 | Chevreux et al. | 303/9.69 |
| 4,058,347 | 11/1977 | Reinecke | 188/195 X |
| 4,324,436 | 4/1982 | Reinecke | 303/22.1 |
| 4,615,566 | 10/1986 | Perrin | 303/6 C |
| 4,624,507 | 11/1986 | Carre et al. | 303/9.69 |
| 4,824,180 | 4/1989 | Levrai | 303/22.5 |

FOREIGN PATENT DOCUMENTS

| | | | |
|---|---|---|---|
| 0156666 | 10/1985 | European Pat. Off. | |
| 0223641 | 5/1987 | European Pat. Off. | |
| 0283328 | 1/1988 | European Pat. Off. | |
| 0719810 | 3/1942 | Fed. Rep. of Germany | 303/22.1 |
| 1288940 | 2/1961 | France | |
| 2499922 | 8/1982 | France | |
| 0057054 | 4/1984 | Japan | 303/22.8 |
| 0089255 | 5/1984 | Japan | 303/22.5 |
| 1542507 | 3/1979 | United Kingdom | |
| 1577029 | 10/1980 | United Kingdom | |
| 2184803 | 7/1987 | United Kingdom | 303/22.5 |

*Primary Examiner*—Andres Kashnikow
*Assistant Examiner*—Timothy Newholm
*Attorney, Agent, or Firm*—Larry J. Palguta; Ken C. Decker

[57] ABSTRACT

The present invention relates to a brake corrector subject to the load of a vehicle despite the possible variation in the height of the seating of the latter. According to the invention, the corrector comprises a fluidic pressure sensor arranged between the vehicle chassis and the corresponding end of a suspension spring of the vehicle, a body (1) in which a slidably mounted at least one piston (2, 3) controlled by an actuating rod (10) and arranged so as to interact with a valve element in order to control a passage of the corrector, the body and the fluidic sensor being connected fluidically in such a way that a variation in pressure determines a first force exerted on the piston, and a sensor of the height of seating of the vehicle, the response of which determines a second force likewise exerted on the piston, the first and second forces combining to act on the piston (2, 3).

7 Claims, 2 Drawing Sheets

FIG:1

BRAKE CORRECTOR SUBJECT TO THE LOAD OF A VEHICLE AS A FUNCTION OF THE SEATING OF THE LATTER

The present invention relates to brake correctors and, more particularly, to such a corrector subject to the load of a vehicle despite possible variation in the height of seating of the latter.

It is known that it is desirable to connect a brake corrector directly to the suspension of a vehicle in order to vary the braking of the wheels of the vehicle as a function of its load.

The document GB-A-No. 1,577,029 makes known a brake corrector which is subject to the load of a vehicle and which is arranged at one end of a suspension spring of the vehicle and connected to the spring by means of an assembly of cams, so as to vary the brake pressure as a function of the load. The disadvantages of this device are that it comprises a large number of components, thus making it expensive and unreliable.

To overcome the disadvantages of a mechanical connection between a corrector and the suspension of a vehicle, it has been proposed to connect the corrector hydraulically to the suspension.

The document FR-A-No. 1,288,940 makes known a brake system for a vehicle, in which a hydraulic transmitter is mounted between a suspension leaf spring and the chassis of the vehicle, this transmitter being connected hydraulically to a brake corrector, so as to make the latter operate as a function of the load of the vehicle.

This device has disadvantages in that it is not suitable for use with a helical suspension spring.

U.S. Pat. No. 4,824,180, which corresponds to EP-A-No. 283,328, describes a brake corrector equipped with a fluidic pressure sensor, the corrector comprising a body recessed with a bore, in which is slidably mounted a piston arranged so as to interact with a valve element in order to control a passage of fluid between an inlet and an outlet of the corrector, the fluidic pressure sensor comprising a piston slidably mounted in a cylinder and intended to be moved in the cylinder by means of a suspension spring of the vehicle on which the assembly is mounted, the variation of force exerted on the piston causing a variation in the pressure of the fluid contained in the cylinder, the corrector and the fluidic pressure sensor being connected fluidically in such a way that the variation in pressure acts on the piston of the corrector.

The fluidic pressure sensor is shaped so as to interact with one end of the suspension spring and has a form substantially matching that of this end.

This solution overcomes the above-mentioned abovementioned disadvantages and constitutes a noteworthy advance in the art.

It is nevertheless unsuitable if the driver of the vehicle can select different heights of seating for his vehicle. In fact, depending on the height of seating, the pressure of the fluidic sensor changes and the response of the brake corrector can be incorrect or incomplete.

An object of the present invention is, therefore, to prevent the response of a brake corrector of the above mentioned type from being changed as a function of the height of seating of the vehicle. The document GB-A-No. 1 542 507 describes such a brake corrector. However, the described embodiment is expensive and intricate. This invention provides a brake corrector of the type described in the precharacterizing part of claim 1 and comprising:

a fluidic pressure sensor arranged between the chassis of the vehicle and the corresponding end of a suspension spring of the vehicle, a body in which is slidably mounted at least one piston controlled by an actuating rod and arranged so as to interact with a valve element in order to control a passage of the brake fluid between an inlet and an outlet of the corrector, the body and the fluidic sensor being connected fluidically in such a way that the variation in pressure determines a first force exerted on the piston, and a sensor of the height of seating of the vehicle, the response of which determines a second force likewise exerted on the piston, the first and second forces combining to act on the piston.

For this purpose, the actuating rod one end of which is in contact with the piston is capable of being driven longitudinally in a translational movement under the combined effects, on the one hand, of a sealed flexible diaphragm defining within the body a chamber of variable volume connected to the fluidic pressure sensor and, on the other hand, of the sensor of the height of seating of the vehicle, which is connected to the other end of the rod projecting from the body.

Figure 2:
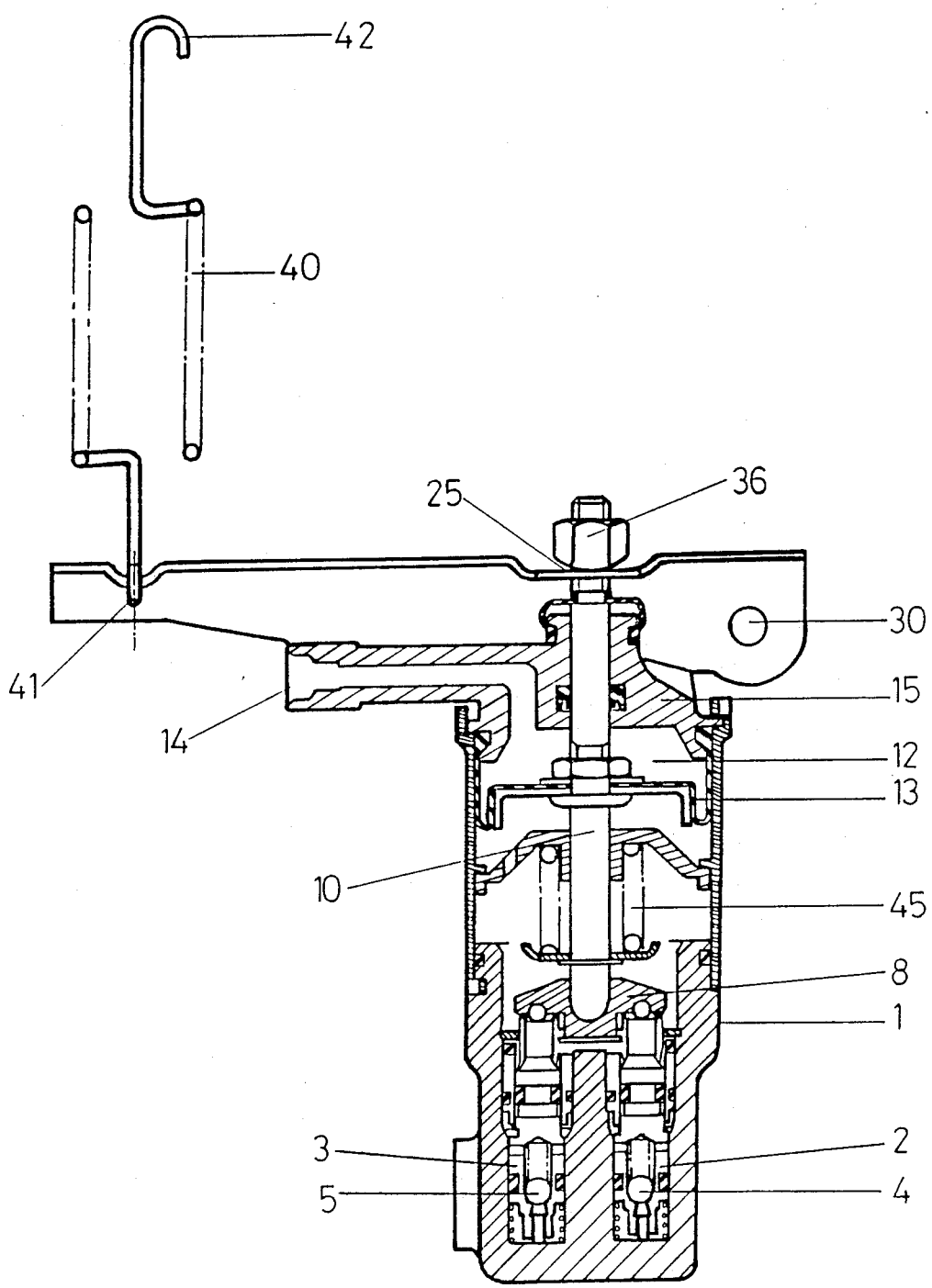

The invention will now be described by way of example with reference to the accompanying drawings in which:

FIGS. 1 and 2 show diagrammatically the body of a brake corrector according to two different embodiments of the present invention.

Referring now to FIG. 1 in which the sensors, both the fluidic sensor and the sensor of the height of seating, have not been shown because they are well known by persons skilled in the art, the body illustrated is that of a brake corrector of the double type, that is to say making the desired correction in two separate brake circuits. The invention applies just as well to a brake corrector of the single type. The operation of the actual corrector will not be described here because it is well known by persons skilled in the art who, if appropriate, can refer to the above-mentioned abovementioned U.S. Pat. No. 4,824,180, which corresponds to EP-A-283,328.

The body 1 thus contains, here, two pistons 2 and 3 controlling the valves 4 and 5. Each piston 2, 3 is subjected, on the one hand, to the pressure of the fluid at the inlet 6,7 respectively and, on the other hand, to the force exerted by a rocker beam 8, on which an actuating rod 10 comes to bear.

A chamber 12 of variable volume is defined within the body 1 by means of a flexible sealed diaphragm 13. This chamber 12 is connected to the fluidic pressure sensor (not shown) by means of the duct 14. The diaphragm 13 is fastened firmly to the rod 10 sealingly, for example by adhesive bonding or by means of a shoulder against which a bolt pinches the diaphragm. Suitable gaskets are arranged so as to prevent any leakage of the fluid contained in the chamber 12.

As can be seen from FIG. 1, the actuating rod 10 passes through the diaphragm 13 and the cover 15 of the body from which it projects. A cup 16 fits over the end of the rod projecting from the cover 15 at a sufficient distance from the latter to ensure that, during the movement of the rod 10, it cannot come up against the cover 15.

A compression spring 20 bears, on the one hand, on the cup 16 and, on the other hand, on a point 25 of a lever included in the sensor of the height of seating of the vehicle. Preferably, the pivot 30 of the lever is fixed to the body 1 and therefore to the chassis, while one end of the lever is connected to a non-suspended point of the vehicle. The point 25 thus corresponds to an intermediate point of the lever between the pivot and the above-mentioned end.

It will therefore be seen that the actuating rod 10 is capable of being driven in a longitudinal translational movement, on the one hand by means of the flexible diaphragm as a function of the load of the vehicle and on the other hand under the effect of the spring 20 as a function of the height of seating of the vehicle.

This results in the desired effect, that is to say having substantially the same cut-off point for all heights of seating. In fact, for a specific load, with low seating of the vehicle the pressure in the chamber 12 is below that prevailing there with high seating, while the force exerted by the spring 20 is greater with low seating than that exerted with high seating. Consequently, the two possible origins of the force exerted by the rod 10 on the pistons 2 and 3 combine to maintain a substantially constant cut-off point of the corrector whatever the height of seating of the vehicle.

In the example illustrated in FIG. 1, the range of values for the cutoff point is such that the force exerted by the spring 20 is in the same direction as that exerted by the diaphragm 13 on the rod 10.

However, it can happen with some vehicles that the forces exerted have to be directed in opposite directions.

In this case as shown in FIG. 2, rod 10 passes freely through point 25 of the lever, and the cup 16 is advantageously replaced by a nut 36 which serves as a shoulder for exerting a rising force.

The end of the lever arm is then fastened to one end 41 of a draw spring 40, the other end 42 of which is fastened to a non-suspended point of the vehicle. Preferably, the compression spring 45 is added, this likewise acting on the actuating rod so as to oppose at least partially the force exerted by the draw spring 40. Although only two preferred embodiments of the invention have been described, it is clear that a person skilled in the art may make numerous modifications to them, without departing from the scope of the invention, as defined by the claims.

What we claim is:

1. A brake corrector intended to be subject to the load of a vehicle despite the possible variation in the height of seating of said vehicle, comprising:

a fluidic pressure sensor arranged between the body of the vehicle and a corresponding end of a suspension spring of the vehicle, a body in which is mounted slidably at least one piston connected with an end of an actuating rod and connected directly with a valve element in order to control a passage of brake fluid between an inlet and an outlet of the corrector, the body and the fluidic pressure sensor being connected fluidically in such a way that a variation in pressure determines a first force exerted on said piston, and a sensor of the height of seating of the vehicle, the response of which determines a second force also exerted on said piston, said first and second forces combining to act on said piston, wherein said actuating rod is capable of being driven longitudinally in a translational movement under the combined effects of a sealed flexible diaphragm connected with an intermediate portion of the actuating rod and of said sensor of the height of seating of the vehicle, said flexible diaphragm defining within said body a chamber of variable volume connected with said fluidic pressure sensor, and the sensor of the height of seating of said vehicle connected with an end of the rod opposite to said piston and projecting from said body.

2. The corrector of claim 1, wherein said sensor of the height of seating of the vehicle comprises a lever, a pivot of which is fixed to said body and one end of which is connected to a non-suspended point of said vehicle, an intermediate point of said lever being connected with the opposite end of the rod.

3. The corrector of claim 2, wherein elastic means is provided for imposing a biasing force on said piston.

4. The corrector of claim 3, wherein said elastic means is a compression spring arranged between said intermediate point and the opposite end of the rod.

5. The corrector of claim 6, wherein the opposite end of the rod is provided with a cup on which said spring bears.

6. The corrector of claim 3, wherein said elastic means is a draw spring arranged between said one end of the lever and said non-suspended point of said vehicle, and said rod passing through said lever at said intermediate point and equipped, at the opposite end, with a shoulder on which said lever exerts a rising force.

7. The corrector of claim 6, wherein a compression spring bears on said body and acts on said rod by opposing the force exerted by said draw spring.

* * * * *